United States Patent
Wu et al.

(10) Patent No.: US 9,151,656 B2
(45) Date of Patent: Oct. 6, 2015

(54) SELF-ALIGNMENT FILLING LEVEL DETECTING DEVICE

(71) Applicant: FINETEK CO., LTD., New Taipei (TW)

(72) Inventors: Bo-Yi Wu, New Taipei (TW); Chi-Fan Liao, New Taipei (TW); Ciu-Hsing Liu, New Taipei (TW); Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 331 days.

(21) Appl. No.: 13/804,039

(22) Filed: Mar. 14, 2013

(65) Prior Publication Data

US 2014/0264098 A1    Sep. 18, 2014

(51) Int. Cl.
*G01F 23/292* (2006.01)
(52) U.S. Cl.
CPC .......... *G01F 23/292* (2013.01); *G01F 23/2922* (2013.01); *G01F 23/2925* (2013.01)

(58) Field of Classification Search
CPC ..... G01F 23/28; G01F 23/04; G01F 23/2927; G01F 23/2924
See application file for complete search history.

(56) References Cited

U.S. PATENT DOCUMENTS

| | | | |
|---|---|---|---|
| 5,029,471 A * | 7/1991 | Goodrich | 73/293 |
| 6,921,911 B2 | 7/2005 | Siepmann | |
| 8,835,825 B2 * | 9/2014 | Barkan et al. | 250/208.1 |

* cited by examiner

*Primary Examiner* — Tony Ko
(74) *Attorney, Agent, or Firm* — Chun-Ming Shih; HDLS IPR SERVICES

(57) ABSTRACT

A self-alignment filling level detecting device has a reflector and a sensor detachable from each other. The sensor has a light emitter, a light sensor, and a controller. The light sensor receives different light intensities when the reflector is assembled to the sensor and when the reflector is not assembled to the sensor. Thus, the controller determines whether the reflector has been accurately engaged and aligned with the sensor or not based on sensing results of the light sensor. Since the reflector and the sensor are detachable from each other, either the reflector or the sensor can be replaced individually if any one of them malfunctions.

11 Claims, 19 Drawing Sheets

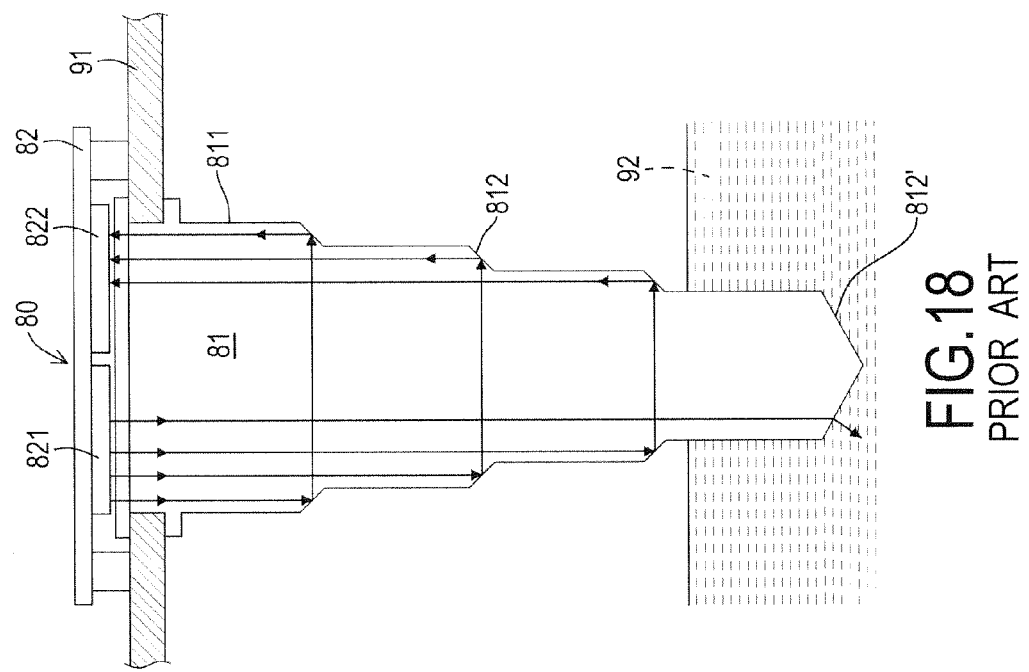

SELF-ALIGNMENT FILLING LEVEL DETECTING DEVICE

BACKGROUND OF THE INVENTION

1. Field of the Invention

The present invention relates to a self-alignment filling level detecting device, and more particular to a self-alignment filling level detecting device comprised of a reflector and a sensor detachable from each other.

2. Description of the Prior Art

Optical level detecting devices are widely used in many different fields such as petrochemical industry, foodstuff industry, iron and steel industry, cement industry, etc. to measure a filling level of raw material or liquid stored in a container.

With reference to FIG. 18, the U.S. Pat. No. 6,921,911, entitled "Method and device for optically determining a filling level in liquid-filled containers", provides a detecting device 80 to be mounted on a wall 91 of a container. The detecting device 80 comprises a body 81 and a circuit board 82.

The body 81 has multiple stepped portions 811, which are connected by reflection faces 812, 812'. The stepped portions 811 and reflection faces 812, 812' have different diameters, wherein the stepped portion 811 at top has a greater diameter than a diameter of the stepped portion at bottom. Each reflection face 812, 812' corresponds to an individual liquid level. Further, the bottom-most reflection faces 812' at a lower end of the body 81 form a V-shape in cross-section.

The circuit board 82 has a light source 821 and a light sensor 822. The light source 821 emits collimated light beams to the reflection faces 812, 812'. In this example, only the bottom-most reflection face 812' is immersed in liquid 92 while other reflection faces 812 are exposed in air. Therefore light beams impinging on the reflection faces 812 in air experience total reflection and are reflected to the light sensor 822. On the other hand, the light beam incident on the bottom-most reflection face 812' is not reflected to the light sensor 822 but is refracted into the liquid 92. Thus, the circuit board 82 can determine the liquid level in the container based on reflected light beams received by the light sensor 822.

To obtain a precise light reflection path, the body 81 and the circuit board 82 are integrally formed together to ensure that the light incident on the reflection faces 812 can be totally reflected. Thus, the body 81 and the circuit board 82 are mounted in the container at the same time. When either the body 81 or the circuit board 82 fails, the entire detecting device 80 should be replaced with a new one.

If the body 81 and the circuit board 82 are separated from each other instead of integrally formed together, the accuracy of light reflection may be adversely affected because of the incorrect or improper alignment between the body 81 and the circuit board 82, thus causing level detecting error.

To overcome the shortcomings, the present invention provides a self-alignment filling level detecting device to mitigate or obviate the aforementioned problems.

SUMMARY OF THE INVENTION

The main objective of the present invention is to provide a self-alignment filling level detecting device comprised of a reflector and a sensor detachable from each other. If the reflector or the sensor malfunctions, the failed one can be individually replaced. Further, when the reflector has been accurately engaged with the sensor, a circuit board provided in the sensor will recognize the assembly of the reflector and the sensor.

According to one preferred embodiment, a light emitter, a light controller, and a light isolator are provided in the sensor of the self-alignment filling level detecting device. The light isolator is movably configured for isolating the light emitter from the light sensor, or providing an optical path to communicate the light emitter with the light, based on relative positions between the reflector and the sensor.

Therefore, according to the light intensity received by the light sensor, the relative positions between the reflector and the sensor can be obtained. The controller thus determines whether the reflector is accurately assembled and aligned with the sensor and ensures high accuracy of filling level detection. When either the reflector or the sensor malfunctions, the failed one can be individually replaced with a new one without need of discarding the entire filling level detecting device.

Other objectives, advantages and novel features of the invention will become more apparent from the following detailed description when taken in conjunction with the accompanying drawings.

BRIEF DESCRIPTION OF THE DRAWINGS

FIG. 18 shows a conventional filling level detector mounted in a container wall.

DETAILED DESCRIPTION OF THE PREFERRED EMBODIMENTS

Figure 1:
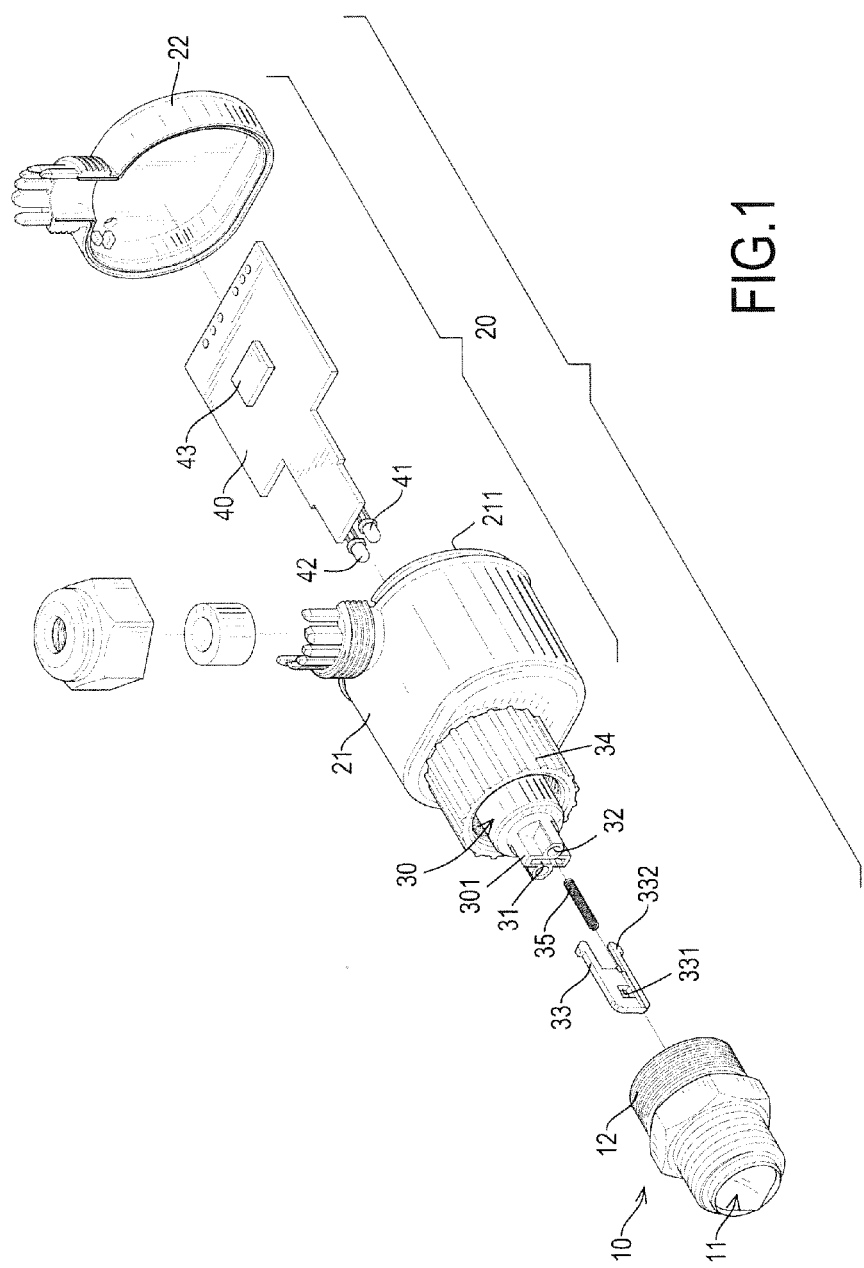
FIG. 1 is an exploded perspective view of a self-alignment filling level detecting device of the present invention.
Figure 2:
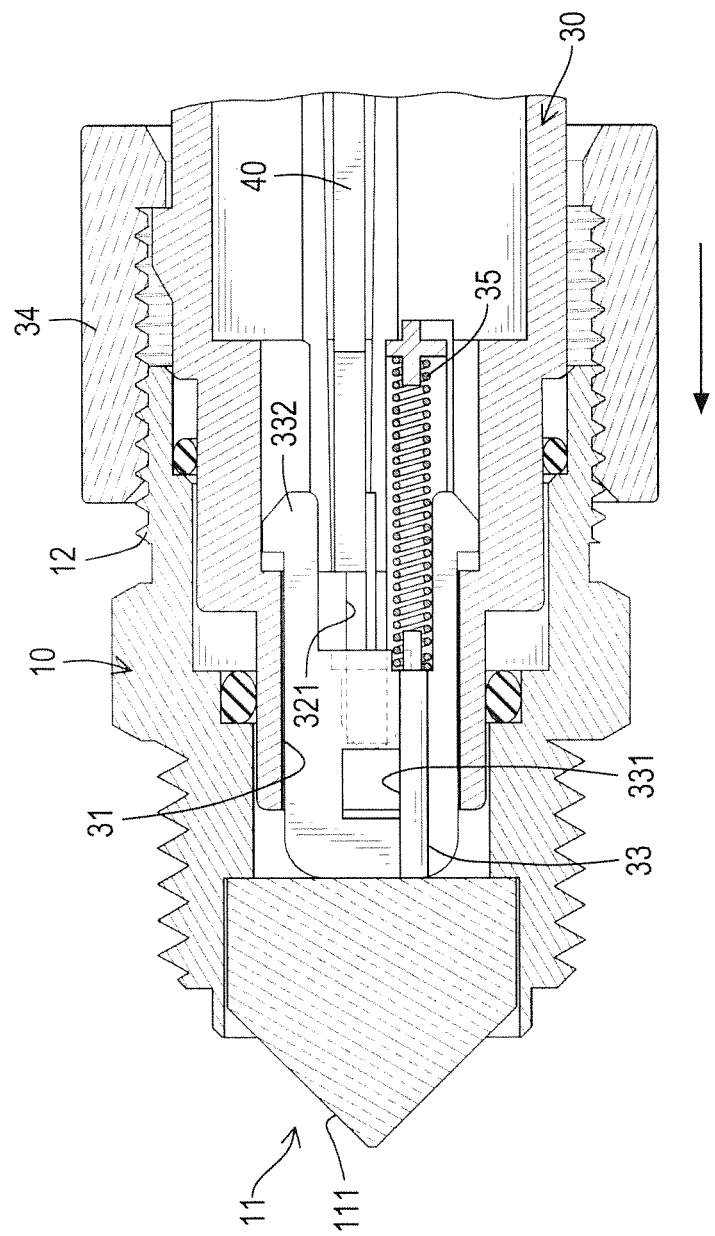
FIG. 2 is a cross-sectional view showing a reflector not yet assembled to a sensor of the present invention.

With reference to FIGS. 1 and 2, a first embodiment of a self-alignment filling level detecting device comprises a reflector 10 and a sensor 20 detachably connected to the reflector 10.

The reflector 10 comprises a tubular body, a reflection head 11, and a connecting portion 12. The reflection head 11 is mounted on a first end of the tubular boy and is in a shape of a cone, wherein the reflection head 11 has a V-shaped cross section with two opposite reflection faces 111. The connecting portion 12 is formed at a second end of the tubular body opposite to the reflection head 11. In this embodiment, the connecting portion 11 has a threaded outer surface.

The sensor 20 comprises a body 21, a cover 22, a linking tube 30, a light isolator 33, a screwing sleeve 34, and a circuit board 40.

The body 21 is hollow and has a first end, a second end opposite to the first end, and an opening 211 formed at the first end, wherein the cover 22 is mounted at the opening 211 of the body.

Figure 5:
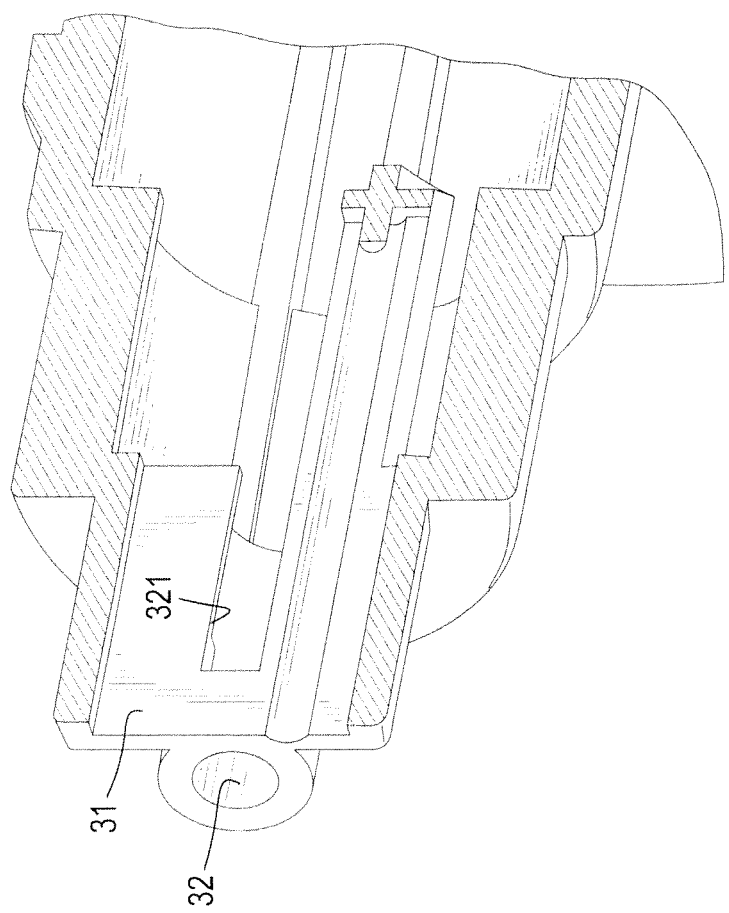
FIG. 5 is cross-sectional view showing an aperture formed in a linking tube of the present invention.

The linking tube 30 protrudes from the second end of the body 21. A protrusion 301 axially extends from one end of the linking tube 30 toward the reflector 10, wherein two sensor channels 32 and a slot 31 are defined in the protrusion 301 and communicate with the linking tube 30. The slot 31 is formed between the two sensor channels 32 and has a rectangular cross section. Each sensor channel 32 has a circular cross section. Further, with reference to FIG. 5, an aperture 321 communicating between the slot 31 and the two sensor channels 32 is formed in the protrusion 301.

The screwing sleeve 34 is mounted around the linking tube 30 and has a threaded inner surface such that the screwing sleeve 34 is correspondingly assemble to the connecting portion 12.

The circuit board 40 is mounted in the body 21 and has a light emitter 41, a light sensor 42, and a controller 43. The light emitter 41 and the light sensor 42 are electronically connected to the controller 43 and are respectively held in the two sensor channels 32.

Figure 3:
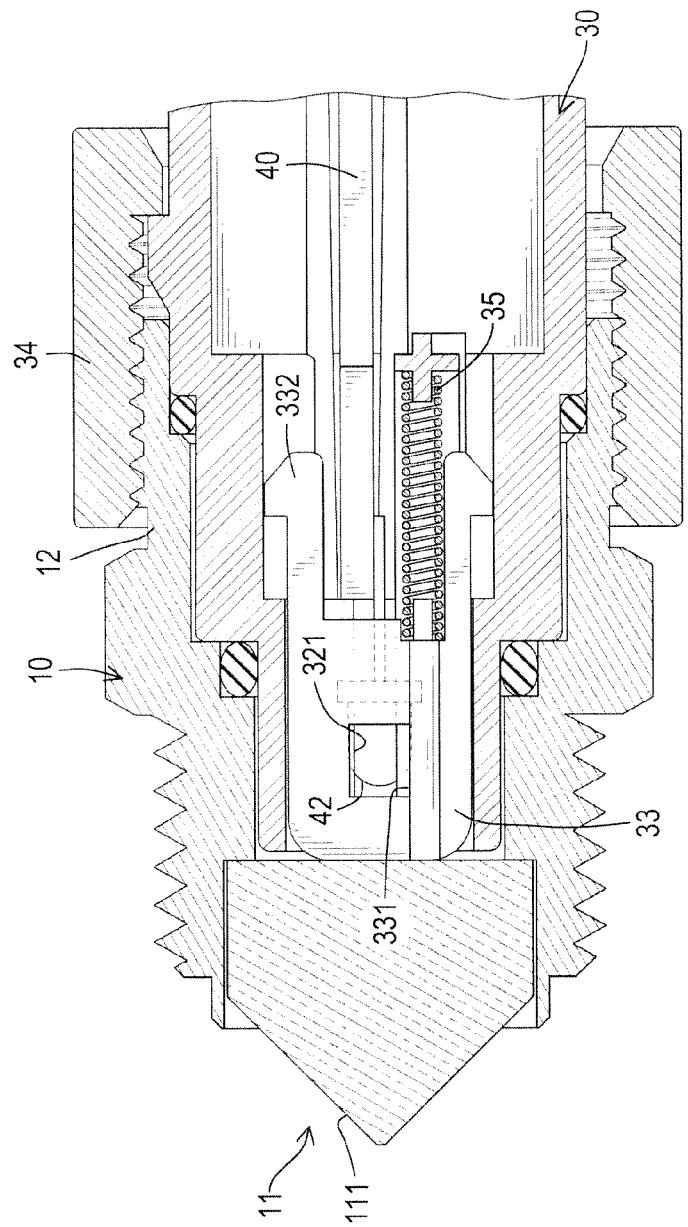
FIG. 3 is a cross-sectional view showing the reflector assembled to the sensor of the present invention.

The light isolator 33 is a partition plate in this embodiment and is mounted in the slot 31 and has a front end toward the reflector 10, and a rear end opposite to the front end. The light isolator 33 has a through hole 331 formed through the light isolator and has two hooks 332 axially extending from the rear end of the light isolator 33. A spring 35 is received in the slot 31 and presses against the read end of the light isolator 33. With reference to FIGS. 2 and 3, as the screwing sleeve 34 rotates in different directions, the reflector 10 will move forward or backward. When the reflector 10 moves toward the sensor 20 and is completely screwed to the sensor 20, the front end of the light isolator 33 abuts a rear side of the reflection head 11 and the spring 35 is compressed.

Figure 6:
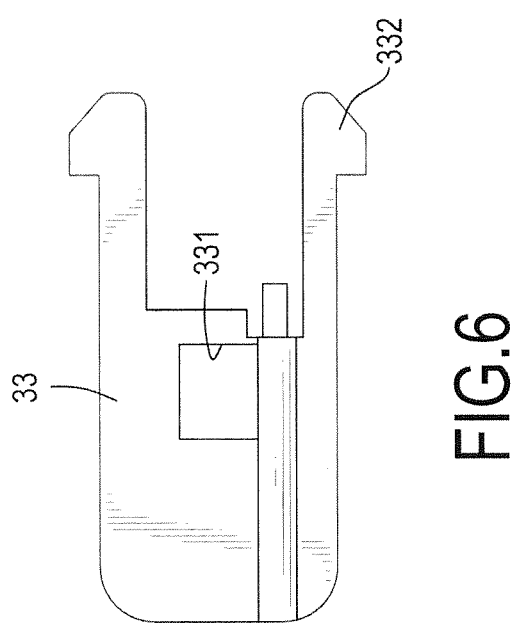
FIG. 6 is a plan view of a light isolator of a second embodiment of a light isolator of the present invention.

The through hole 331 may be formed through the light isolator 33 proximal to either the front end or the rear end, as shown on FIG. 6, based on the sensing methods of the controller 43. The two hooks 332 abut against an inner wall of the slot 31 and limit the position the light isolator 33 to prevent the light isolator 33 from ejecting from the slot 31. The following descriptions disclose the embodiments that the through hole 331 is formed proximal to the front end and that the through hole 331 is formed proximal to the rear end of the light isolator 33, and the corresponding sensing methods of the controller 43.

A. The Through Hole 331 is Formed Proximal to the Front End of the Light Isolator 33

When the through hole 331 is formed proximal to the front end of the light isolator 33 and the reflector 10 is not yet completely screwed to the sensor 20 as shown in FIG. 2, the light emitter 41 is isolated from the light sensor 42 by the light isolator 33. When the reflector 10 is completely screwed to the sensor 20 and pushes the light isolator 33 to a predetermined position, the through hole 331 aligns with the light emitter 41 and the light sensor 42, and a part of a light beam emitted from the light emitter 41 can directly impinge on the light sensor 42 through the through hole 331 as shown in FIG. 3.

Figure 4:
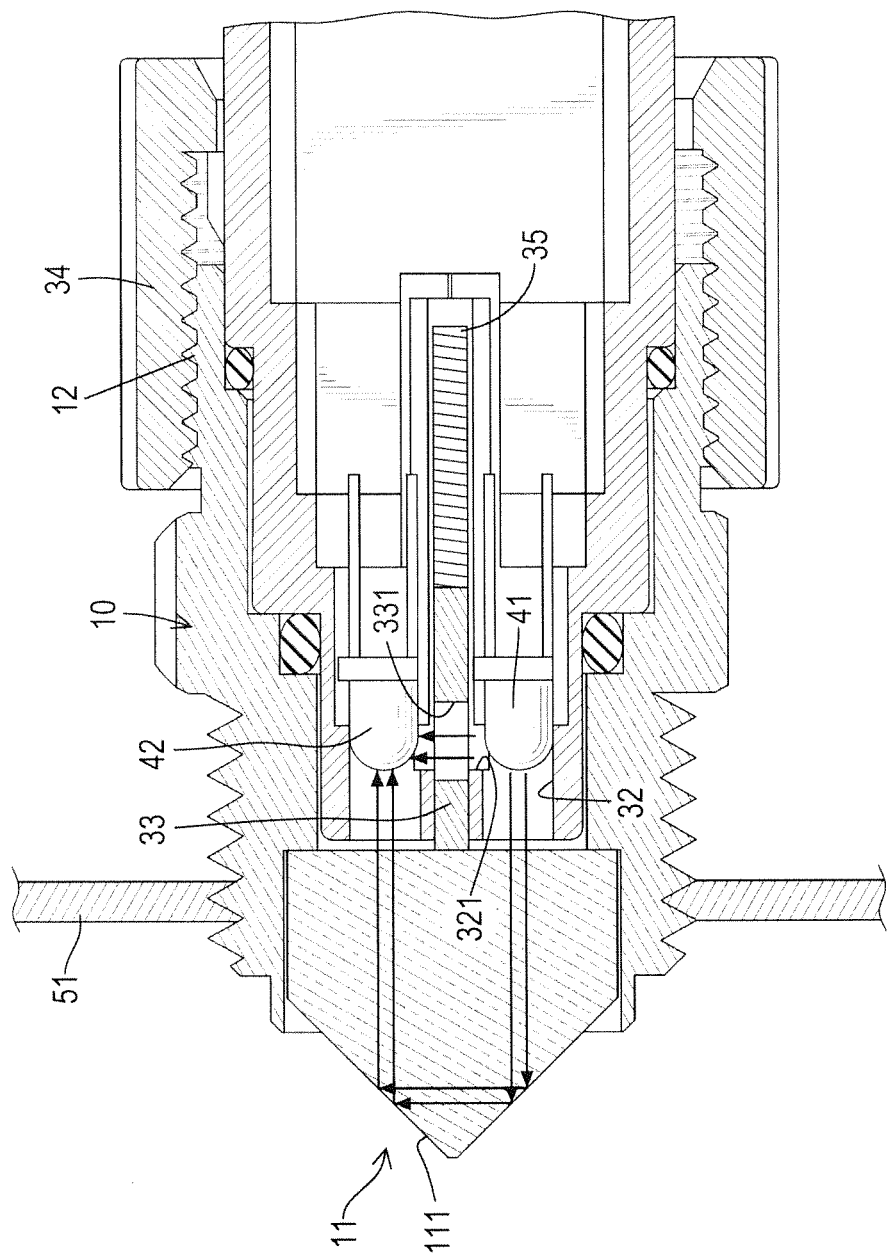
FIG. 4 is a cross-sectional view showing the self-alignment filling level detecting device of the present invention being mounted in a side wall of a container.
Figure 4A:
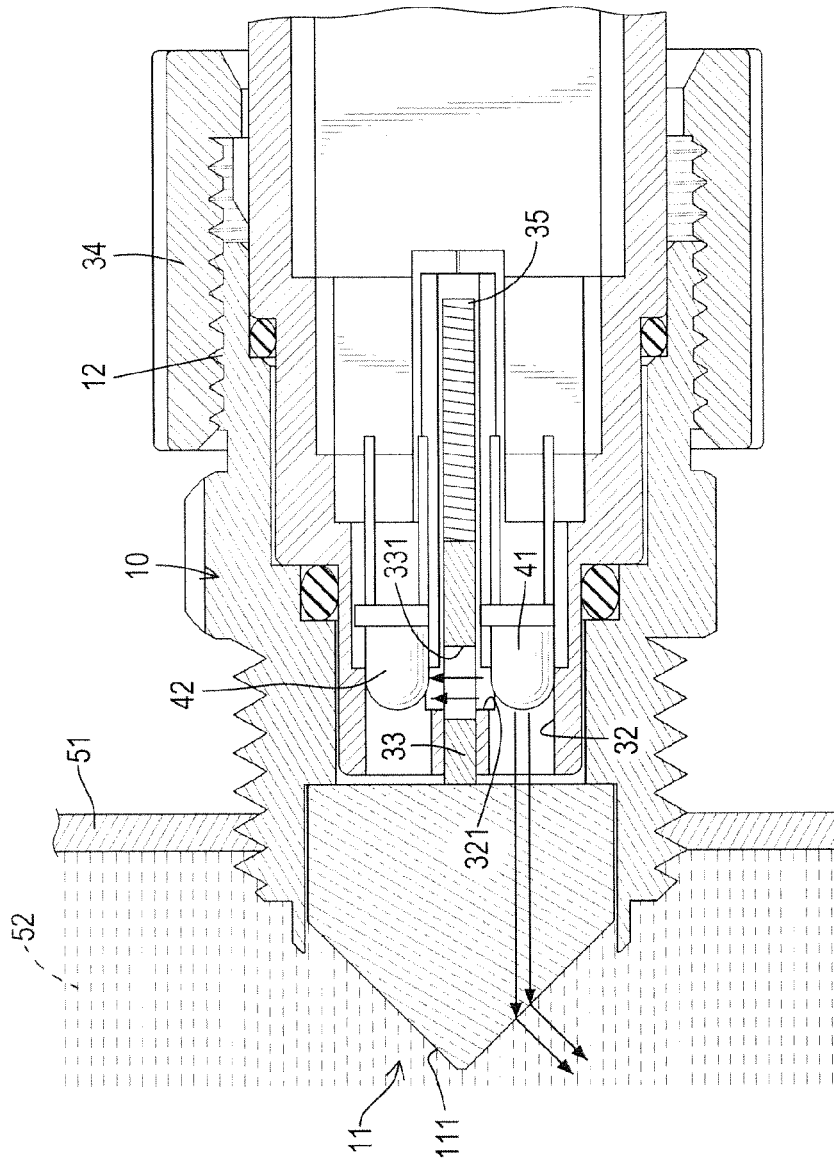
FIG. 4A a cross-sectional view showing the self-alignment filling level detecting device of the present invention is mounted in the side wall and the reflector is immersed in liquid.

With reference to FIG. 4, when the reflector 10 is fixed in a wall 51 of a container or a tank and is not immersed in liquid, the light beam output from the light emitter 41 is totally reflected by the reflection head 11 to the light sensor 42. With reference to FIG. 4A, on the other hand, when the reflector 10 is immersed in liquid 52, the light beam incident on the reflection head 11 is not reflected to the light sensor 42 but is refracted into the liquid 52.

Therefore, based on the light intensity sensed by the light sensor 42, the controller 43 recognizes whether the reflector 10 has been immersed in the liquid 52 and correctly assembled to the sensor 20.

B. The Through Hole 331 is Formed Proximal to the Rear End of the Light Isolator 33

When the through hole 331 is formed proximal to the front end of the light isolator 33 and the reflector 10 is not yet completely screwed to the sensor 20, the through hole 331 aligns with the light emitter 41 and the light sensor 42, and a part of a light beam emitted from the light emitter 41 can directly impinge on the light sensor 42 through the through hole 331.

On the other hand, when the reflector 10 is completely screwed to the sensor 20 and pushes the light isolator 33 to a predetermined position, the light emitter 41 is isolated from the light sensor 42 by the light isolator 33. The light sensor 42 only detects the refracted light from the reflection head 11 when the reflector 10 is immersed in the liquid. Thus, the controller 43 still can recognize whether the reflector 10 has been assembled to the sensor 20 correctly.

Figure 7:
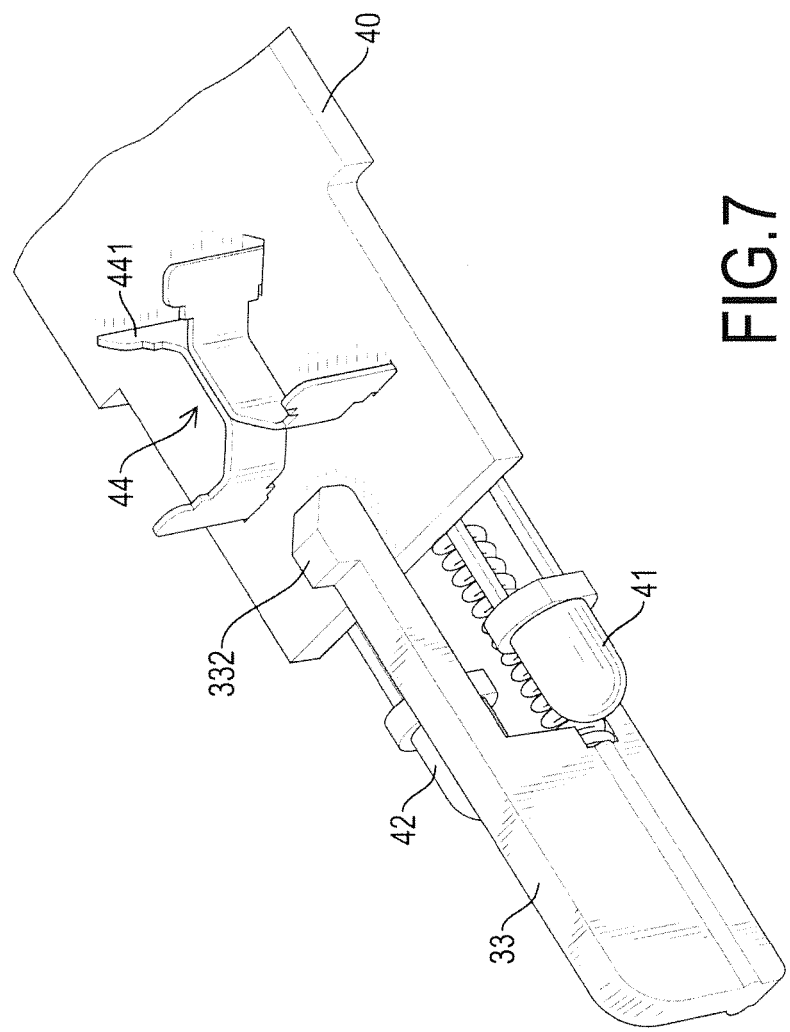
FIG. 7 is a perspective view showing the light isolator and a contact switch.
Figure 8:
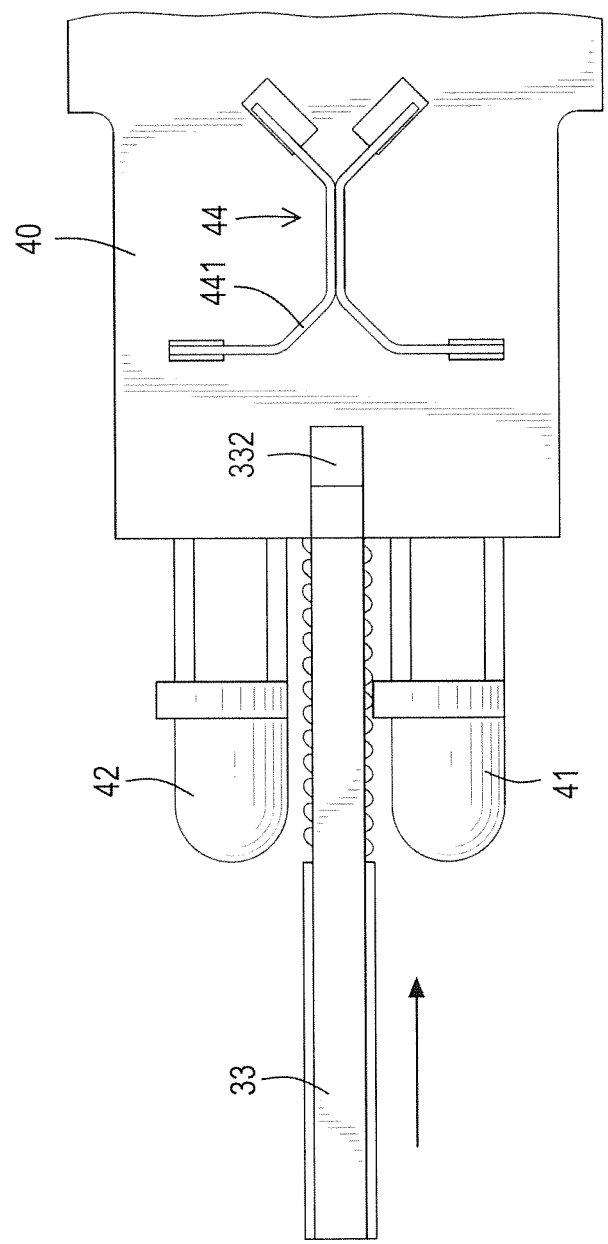
FIG. 8 is a top plan view of the light isolator and the contact switch in FIG. 7.
Figure 9:
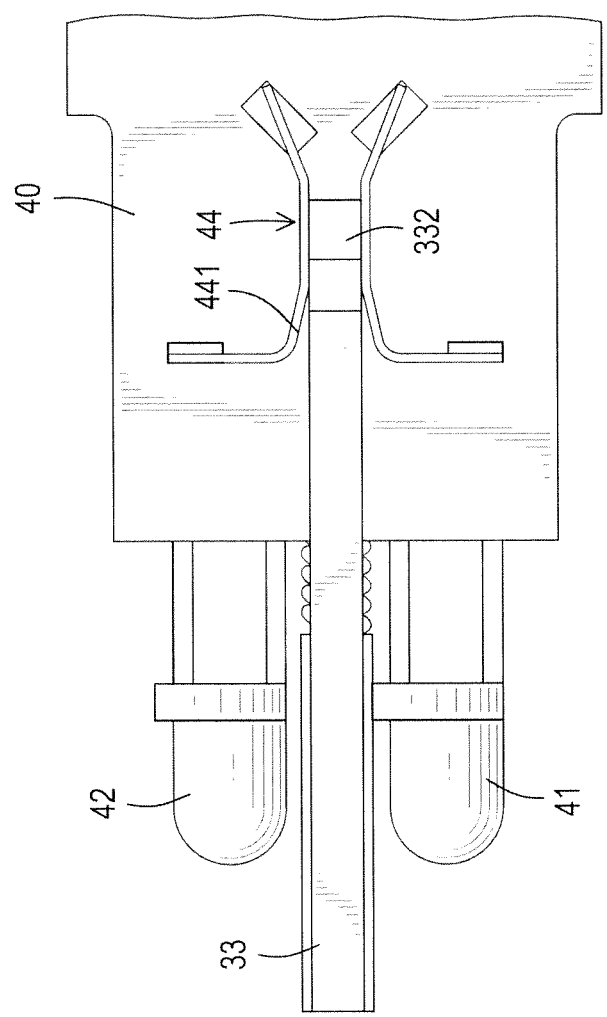
FIG. 9 is a top plan view showing the light isolator electrically touching the contact switch.

With reference to FIGS. 7 to 9, the circuit board 40 may further comprise a contacting switch 44 comprised of two C-shaped conductive sheets 441. The switch 44 is triggered to generate either a conduction signal (short circuit signal) or a non-conduction signal (open circuit signal) depending on the position of the light isolator 33. Based on the signal of the contacting switch 44, the controller 43 recognizes whether the reflector 10 has been accurately assembled to the sensor 20.

In one embodiment, the two conductive sheets 441 are configured back-to-back on the circuit board 40 and contact each other. When the light isolator 33 moves toward the circuit board 40 and the hook 332 separates the two conductive sheets 441 from each other, the contacting switch 44 changes its status and generates the non-conduction signal. The controller 43 recognizes that the reflector 10 has been accurately assembled to the sensor 20 based on the non-conduction signal.

In another alternative embodiment, the two conductive sheets 33 are configured separately on the circuit board 40 and spaced apart from each other. The hook 332 of the light isolator 33 should be conductive or coated with a conductive layer. When the light isolator 33 moves toward the circuit board 40 and the hook 332 interferes between the two conductive sheets 441, the hook 332 electronically contacts the two conductive sheets 441. The contacting switch 44 changes its status and generates the conduction signal. The controller 43 recognizes that the reflector 10 has been accurately assembled to the sensor 20 based on the conduction signal.

Figure 10:
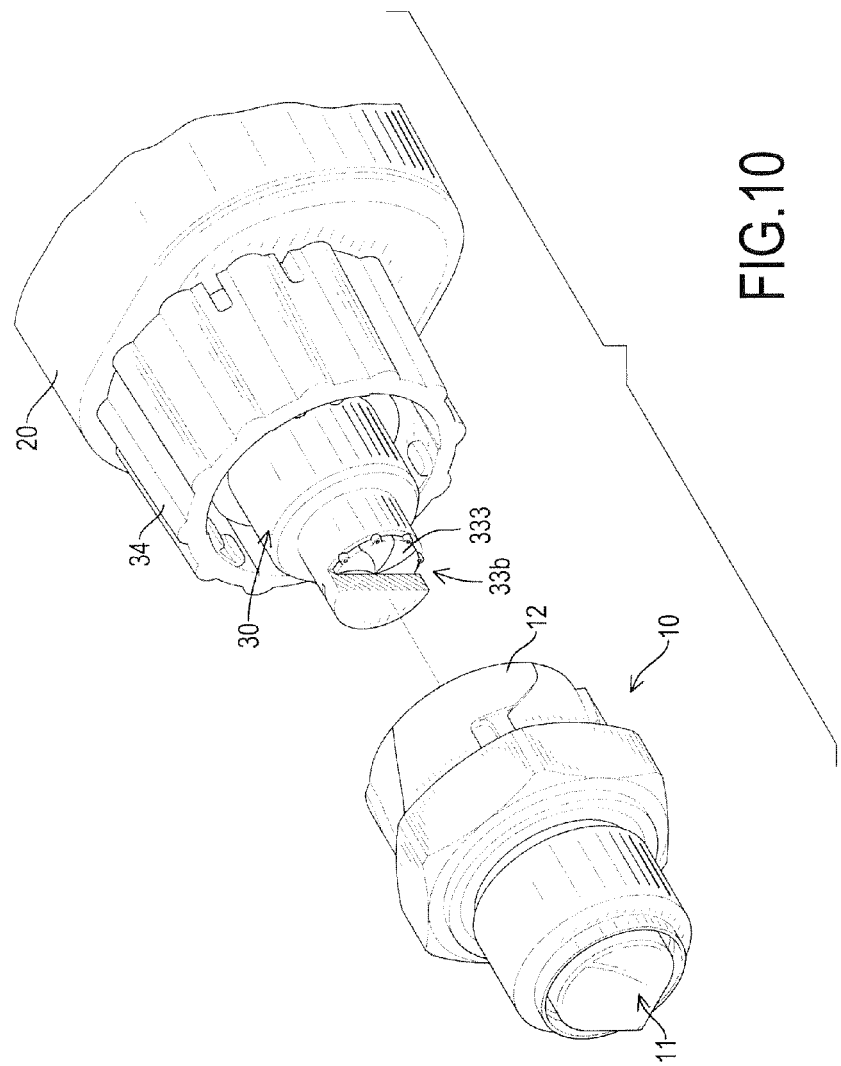
FIG. 10 is an exploded perspective view showing another embodiment of a reflector and a linking tube having a light gate of the present invention.
Figure 11:
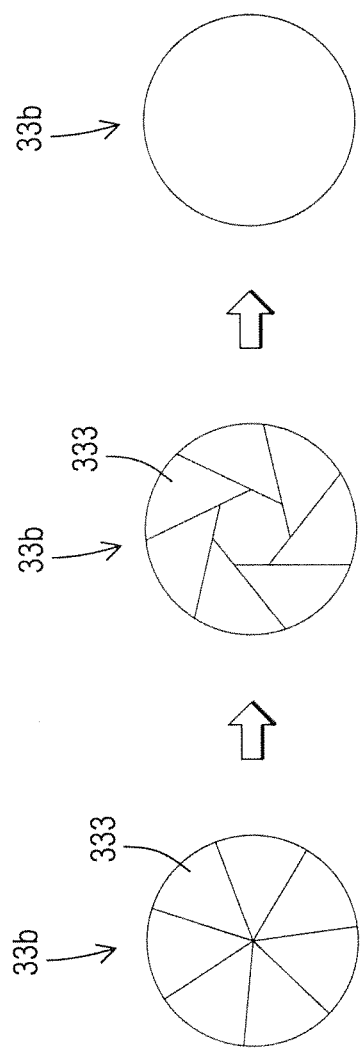
FIG. 11 shows operations of the light gate in FIG. 10.

With reference to FIGS. 10 and 11, the light isolator 33b is a light gate with an adjustable light aperture. The light gate is configured in front of the light emitter 41 and the light sensor 42 and is comprised of multiple gate plates 333. As the screwing sleeve 34 rotates to assemble the sensor 20 to the reflector 10, all the gate plates 333 are also driven to adjust the size of the light aperture. For example, when the reflector 10 has been assembled to the sensor 20, the light gate is completely open and the light beam emitted from the light emitter 41 can pass through the light gate and eventually reflected by the reflection head 11 to the light sensor 42. Therefore, the controller 43 can recognize that the reflector 10 has been accurately assembled to the sensor 20. On the other hand, if the reflector 10 is not yet assembled to the sensor 20 at the predetermined position, the light gate is closed. The light beam emitted from the light emitter will be blocked by the light gate and not reflected.

Figure 12:
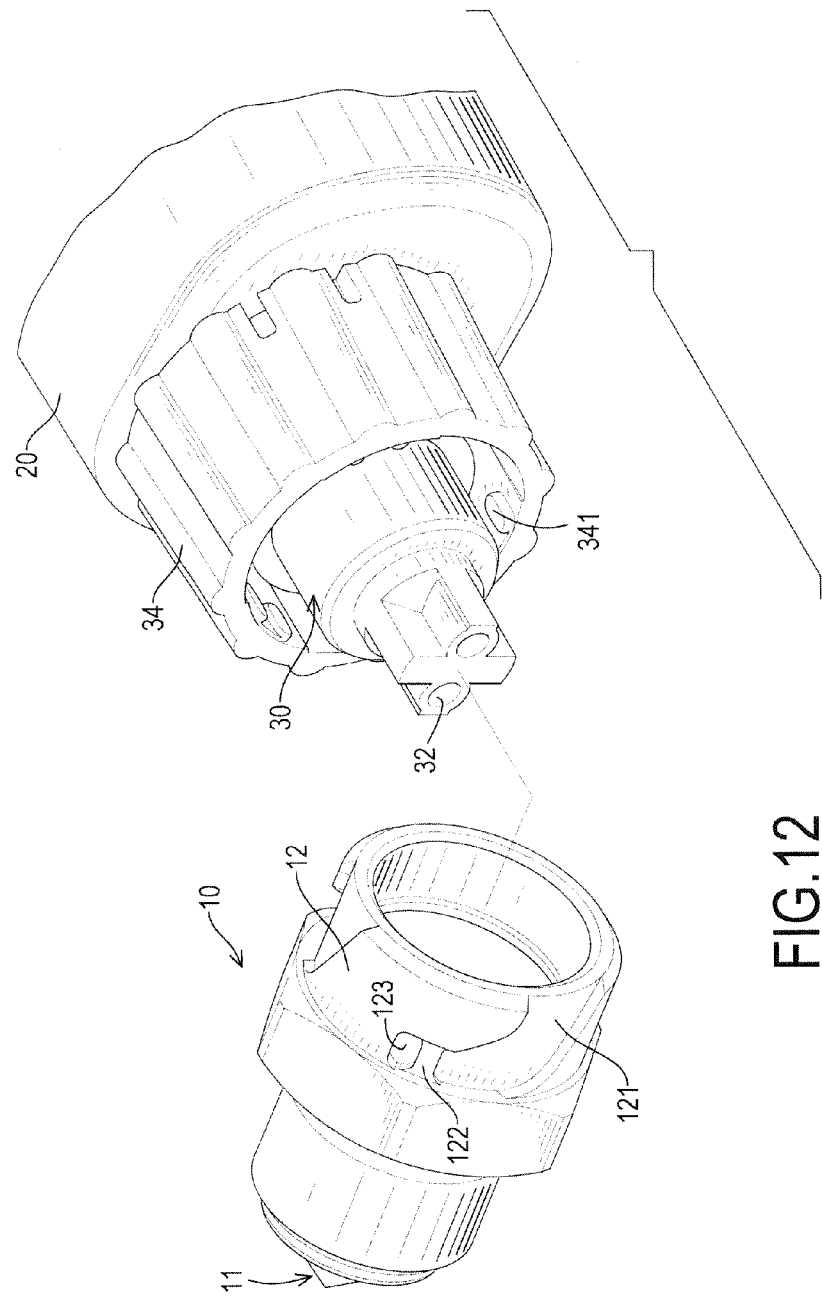
FIG. 12 is an exploded perspective view showing yet another embodiment of a reflector and a screwing sleeve of the present invention.
Figure 13:
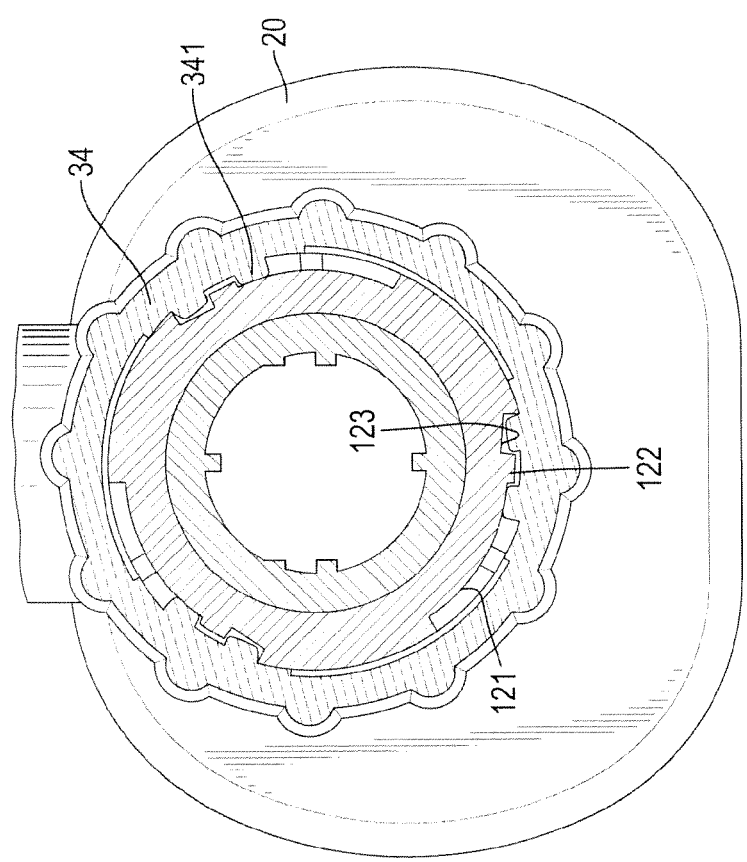
FIG. 13 is a cross sectional view of the reflector and the screwing sleeve of FIG. 12 assembled together.

With reference to FIGS. 12 and 13, multiple spiral grooves 121, instead of threads, are formed on the outer surface of the connecting portion 12. A rib 122 and a recess 123 are formed at a distal end of each spiral groove 121. Multiple positioning blocks 341, instead of inner threads, are formed on the inner surface of the screwing sleeve 34. The positioning blocks 341 move along the spiral grooves 121 and eventually engaged in the recesses 123 as the screwing sleeve 34 rotates to fasten the reflector 10 to the sensor 20.

Figure 14:
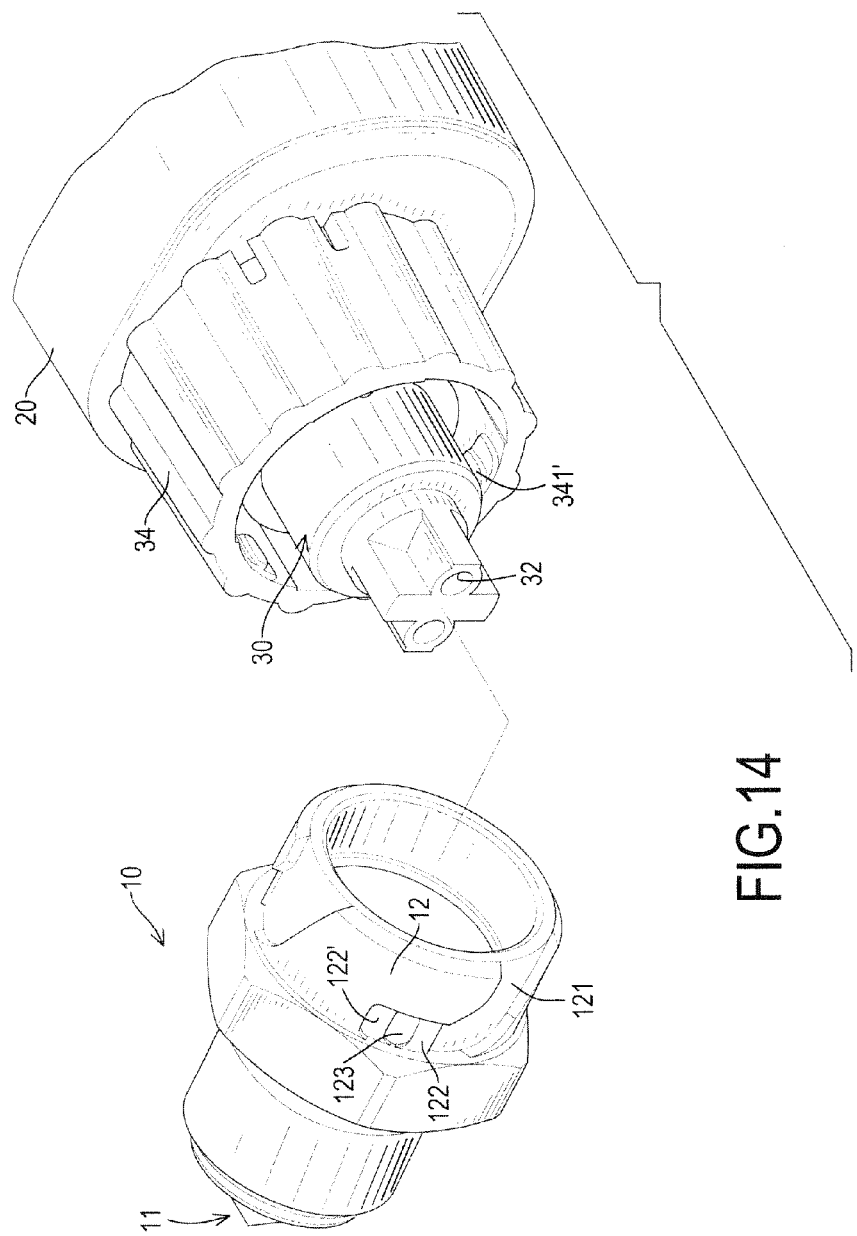
FIG. 14 is an exploded perspective view showing yet another embodiment of a reflector and a screwing sleeve of the present invention.
Figure 15:
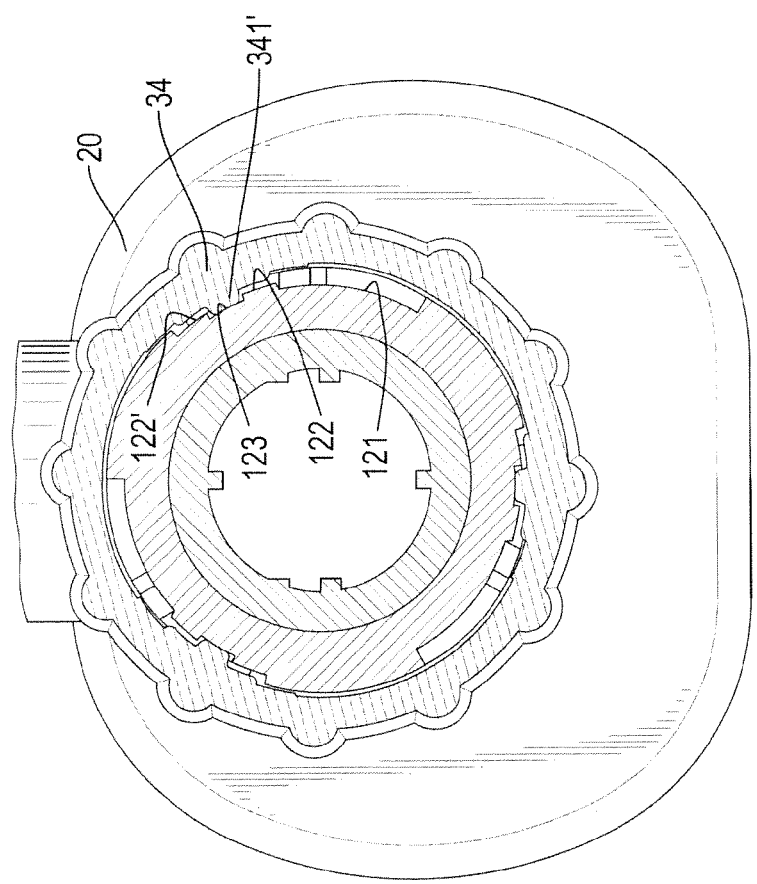
FIG. 15 is a cross sectional view of the reflector and the screwing sleeve of FIG. 12 assembled together.

With reference to FIGS. 14 and 15, this embodiment is similar to the embodiment of FIGS. 12 and 13. The difference is that two ribs 122, 122' and a recess 123 between the two ribs 122,122' are formed in the distal end of each spiral groove 121. Multiple positioning blocks 341 are formed on the inner surface of the screwing sleeve 34. The positioning blocks 341' move along the spiral grooves 121 and eventually engage in the recesses 123 as the screwing sleeve 34 rotates to fasten the reflector 10 to the sensor 20.

Figure 16:
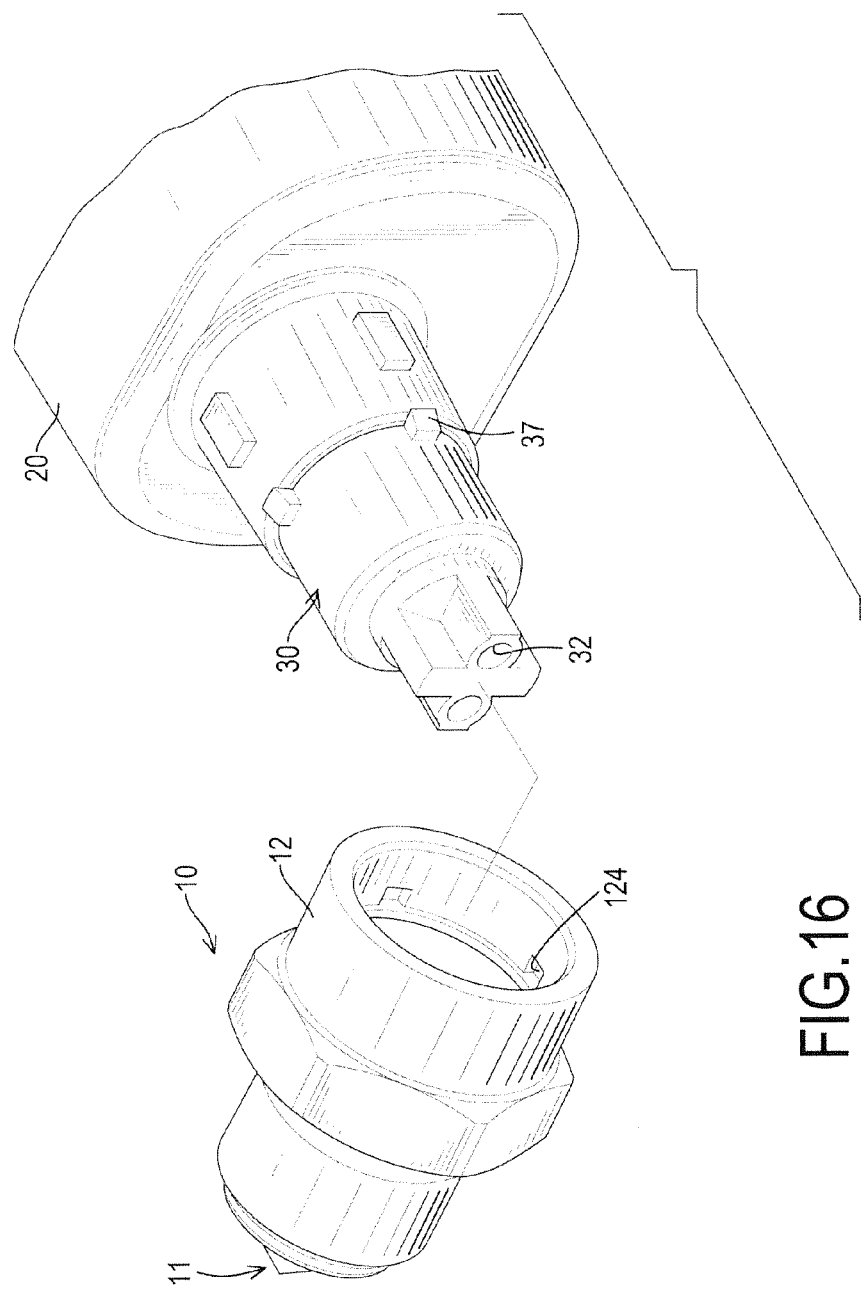
FIG. 16 is an exploded perspective view showing another embodiment of a reflector and a linking tube of the present invention.
Figure 17:
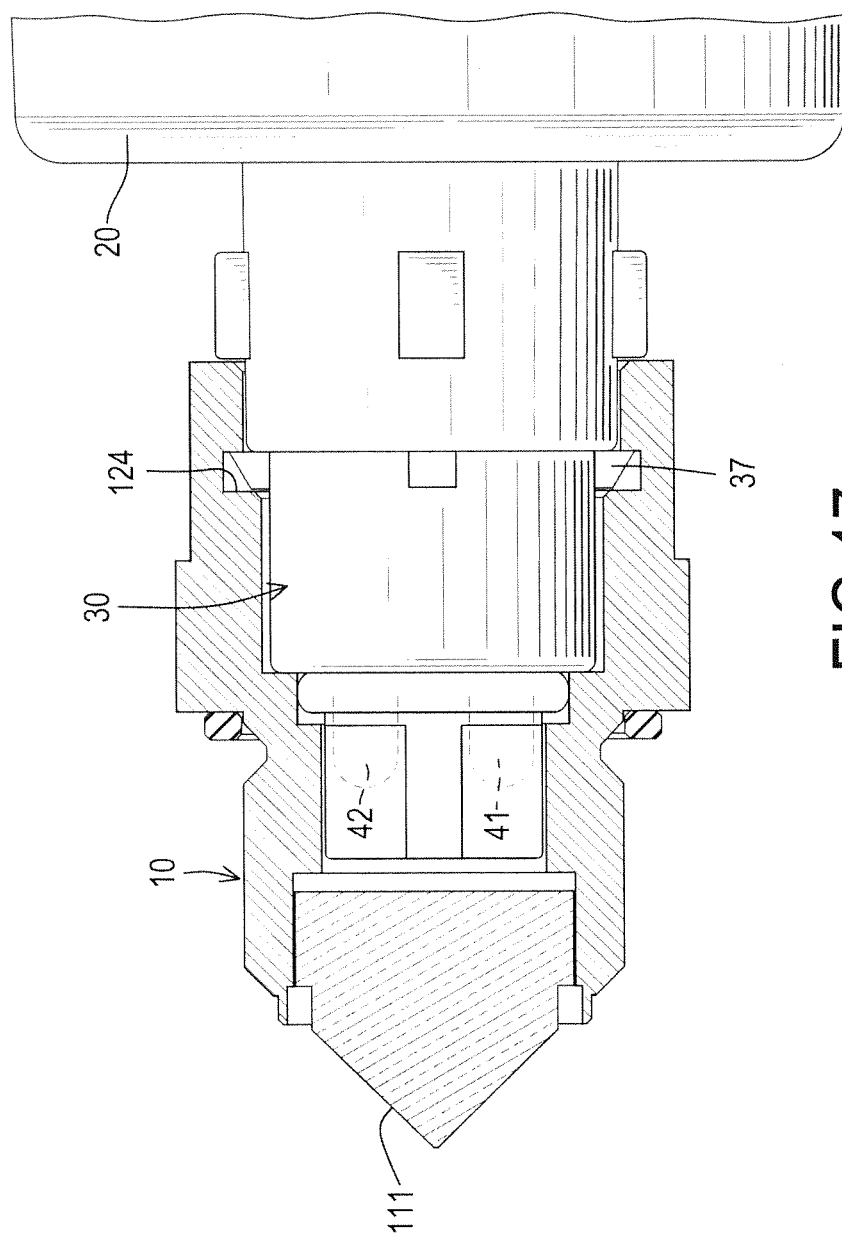
FIG. 17 is a cross sectional view of the reflector and the linking tube of FIG. 16 assembled together.

With reference to FIGS. 16 and 17, multiple positioning recesses 124 are formed in the inner surface of the connecting portion 12. Multiple blocks 37 are formed on the outer surface of the linking tube 30 to be correspondingly engaged in the positioning recesses 124, wherein each block 37 has an inclined top surface.

In the present invention, the light isolator 33 can separate the light emitter 41 from the light sensor 42 or provide a light path communicating between the light emitter 41 and the light sensor 42. The controller 43 determines whether the reflector 10 has been correctly assembled to the sensor 20 based on the light status between the light emitter 41 and the light sensor 42. The reflector 10 can engage with the sensor 20 via the matched threads formed on the connecting portion 12 and the screwing sleeve 34, or via the recesses 124 and the blocks 37.

For repair or maintenance purposes, either the reflector 10 or the sensor 20 can be individually replaced with a new one. After the replacement, both the reflector 10 and the sensor 20 still maintain correct alignment between each other to ensure high accuracy of filling level detection.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-alignment filling level sensing device comprising:
  a reflector comprising:
    a tubular body having a first end and a second end;
    a reflection head mounted on the first end of the tubular body and having a V-shaped cross section with two opposite reflection faces; and
    a connecting portion formed at the second end of the tubular body;
  a sensor comprising:
    a body being hollow and having a first end, a second end opposite to the first end, and an opening formed at the first end;
    a linking tube protruding from the second end of the body and mounted in the reflector;
    a screwing sleeve mounted around the linking tube and detachably engaged with the connecting portion;
    a circuit board mounted in the body of the sensor and having a light emitter, a light senor and a controller; and
  a light isolator movably mounted in the linking tube;
  wherein the controller determines whether the reflector has been accurately engaged with the sensor according to light intensity received by the light sensor,
  wherein the light isolator is a partition plate, is axially mounted in the linking tube, and has a through hole formed through the light isolator; and
  the light isolator is movably configured at a predetermined position in the linking tube to isolate light beams emitted from the light emitter from impinging on the light sensor when the reflector has been accurately engaged with the sensor.

2. The self-alignment filling level sensing device as claimed in claim 1, wherein the light isolator is mounted in front of the light emitter and the light sensor and at back of the reflector; and
  the light isolator is a light gate comprised of multiple gate plates to form an adjustable light aperture, wherein a size of the adjustable light aperture is changed as the screwing sleeves rotates.

3. The self-alignment filling level sensing device as claimed in any claim of claims 1, wherein the connecting portion has a threaded outer surface and the screwing sleeve has a threaded inner surface to connect to the threaded outer surface.

4. The self-alignment filling level sensing device as claimed in any claim of claims 1, wherein multiple spiral grooves are formed in an outer surface of the connecting portion, and at least one rib and a recess are formed at a distal end of each spiral groove; and
  multiple positioning blocks are formed on an inner surface of the screwing tube, the multiple positioning blocks being movable along the spiral grooves and respectively mounted in the recesses.

5. The self-alignment filling level sensing device as claimed in any claim of claims 1, wherein multiple spiral grooves are formed in an outer surface of the connecting portion, and two ribs and a recess between the two ribs are formed at a distal end of each spiral groove; and
  multiple positioning blocks are formed on an inner surface of the screwing tube, the multiple positioning blocks being movable along the spiral grooves and respectively mounted in the recesses.

6. The self-alignment filling level sensing device as claimed in any claim of claims 1, wherein multiple recesses are formed in an inner surface of the connecting portion; and
multiple positioning blocks are formed on an outer surface of the linking tube, the multiple positioning blocks each respectively mounted in the recesses, wherein each positioning block has an inclined top surface.

7. A self-alignment filling level sensing device comprising:
a reflector comprising:
a tubular body having a first end and a second end;
a reflection head mounted on the first end of the tubular body and having a V-shaped cross section with two opposite reflection faces; and
a connecting portion formed at the second end of the tubular body;
a sensor comprising:
a body being hollow and having a first end, a second end opposite to the first end, and an opening formed at the first end;
a linking tube protruding from the second end of the body and mounted in the reflector;
a screwing sleeve mounted around the linking tube and detachably engaged with the connecting portion;
a circuit board mounted in the body of the sensor and having a light emitter, a light senor, a controller, and a contact switch;
a light isolator movably mounted in the linking tube;
wherein the controller determines whether the reflector has been accurately engaged with the sensor according to whether the light isolator electronically contacts the contact switch,
wherein the light isolator is moved to trigger the contact switch to generate a short circuit signal, and the controller determines that the reflector has been accurately engaged with the sensor based on the short circuit signal.

8. The self-alignment filling level sensing device as claimed in any claim of claims 7, wherein the connecting portion has a threaded outer surface and the screwing sleeve has a threaded inner surface to connect to the threaded outer surface.

9. The self-alignment filling level sensing device as claimed in any claim of claims 7, wherein multiple spiral grooves are formed in an outer surface of the connecting portion, and at least one rib and a recess are formed at a distal end of each spiral groove; and
multiple positioning blocks are formed on an inner surface of the screwing tube, the multiple positioning blocks being movable along the spiral grooves and each respectively mounted in the recesses.

10. The self-alignment filling level sensing device as claimed in any claim of claims 7, wherein multiple spiral grooves are formed in an outer surface of the connecting portion, and two ribs and a recess between the two ribs are formed at a distal end of each spiral groove; and
multiple positioning blocks are formed on an inner surface of the screwing tube, the multiple positioning blocks being movable along the spiral grooves and each respectively mounted in the recesses.

11. The self-alignment filling level sensing device as claimed in any claim of claims 7, wherein multiple recesses are formed in an inner surface of the connecting portion; and
multiple positioning blocks are formed on an outer surface of the linking tube, the multiple positioning blocks each respectively mounted in the recesses, wherein each positioning block has an inclined top surface.

* * * * *